United States Patent [19]
Gross et al.

[11] Patent Number: 4,875,935
[45] Date of Patent: Oct. 24, 1989

[54] ANIONIC ACRYLAMIDE POLYMERS AS COPPER ORE AGGLOMERATION AIDS

[75] Inventors: Anthony E. Gross, St. Charles; Jacqueline L. Bonin, Oak Park, both of Ill.

[73] Assignee: Nalco Chemical Company, Naperville, Ill.

[21] Appl. No.: 267,134

[22] Filed: Nov. 4, 1988

[51] Int. Cl.$^4$ .............................................. C22B 15/08
[52] U.S. Cl. .......................................... 75/117; 75/3; 75/101 R; 210/734; 423/27
[58] Field of Search ...................... 75/2, 101 R, 117, 3; 210/725, 727, 728, 734; 423/27, 34

[56] References Cited
U.S. PATENT DOCUMENTS

| Re. 28,474 | 7/1974 | Anderson et al. | 260/29.6 H |
| 3,284,393 | 11/1966 | Vanderhoff et al. | 260/29.6 |
| 3,418,237 | 12/1968 | Booth et al. | 210/734 |
| 3,692,673 | 9/1972 | Hoke | 210/734 |
| 3,893,847 | 7/1975 | Derrick | 75/3 |
| 4,703,092 | 10/1987 | Fong | 525/351 |
| 4,704,209 | 11/1987 | Richardson et al. | 210/734 |
| 4,802,914 | 2/1989 | Rosen et al. | 75/3 |

FOREIGN PATENT DOCUMENTS 0225596 6/1987 European Pat. Off. .

OTHER PUBLICATIONS

"Evaluation of Copper Dump and Heap Leaching Situations", by J. M. Keane and C. K. Chase, *Mining Engineering*, pp. 197-200, Mar. 1987.
"Technical Innovations Spur Resurgence of Copper Solution Mining", by J. B. Hiskey, *Mining Engineering*, pp. 1036-1039, Nov. 1986.
"Thin Layer Leaching of Oxide Copper Ores", J. H. Canterford and D. A. Swift, CSIRO Division of Mineral Chemistry, Melbourne, Paper B4A, *CHEMECA 85*.
"Cyanamer Polyacrylamides for the Processing Industries", bulletin from the American Cyanamid Company, PRT-21D.

Primary Examiner—Peter Hruskoci
Attorney, Agent, or Firm—John G. Premo; Anthony L. Cupoli; Donald G. Epple

[57] ABSTRACT

An improved method for extracting copper from copper minerals by heap leaching with dilute sulfuric acid which comprises agglomerating the copper mineral fines prior to their being formed into an heap with an agglomerating agent comprising an anionic acrylamide polymer which contains at least 5 mole percent of carboxylate or sulfonate groups and has a molecular weight of least 100,000.

5 Claims, 3 Drawing Sheets

EVALUATION OF BINDERS ON ORE A
0.25 LB/TON BINDER
WT. LEACH SOLUTION/WT. ORE

—○— BLANK
—□— COMPOSITION 1
···△··· COMPOSITION 3
--◇-- COMPOSITION 2

ANIONIC ACRYLAMIDE POLYMERS AS COPPER ORE AGGLOMERATION AIDS

INTRODUCTION

Copper can be extracted from "oxide" copper minerals such as malachite, azurite, chrysocolla, and cuprite by heap leaching with sulfuric acid. In this method, ore is crushed to about -1", agglomerated with 20-60 lb./ton concentrated sulfuric acid, and stacked to 10-20 ft. depth. Dilute sulfuric acid (20 g/l) is then sprayed onto and allowed to percolate down through the heap. During the percolation, copper is dissolved as $CUSO_4$. Solution is drawn off at the bottom of the heap for further processing such as solvent extraction and electrowining.

For a further description of the heap leaching of copper ores, reference should be had to the following two articles: "Technical Innovations Spur Resurgence of Copper Solution Mining", J. B. Hiskey, *Mining Engineering*, pg. 1036-1039, November 1986, and "Evaluation of Copper Dump and Heap Leaching Situations", J. M. Keane and C. K. Chase, *Mining Engineering*, pg. 197-200, March 1987.

A major problem is segregation of the fines in building the heap and migration of fines during percolation which results in channeling of the leach solution and/or blinding of the heap. Blinding and channeling will cause dry areas in the heap giving low recovery of copper. In this invention, the crushed ore is agglomerated by spraying a high molecular weight anionic acrylamide polymer in dilute sulfuric acid or water solution onto tumbling ore to bind the fines and prevent the above problem.

THE DRAWINGS

THE INVENTION

Figure 1:
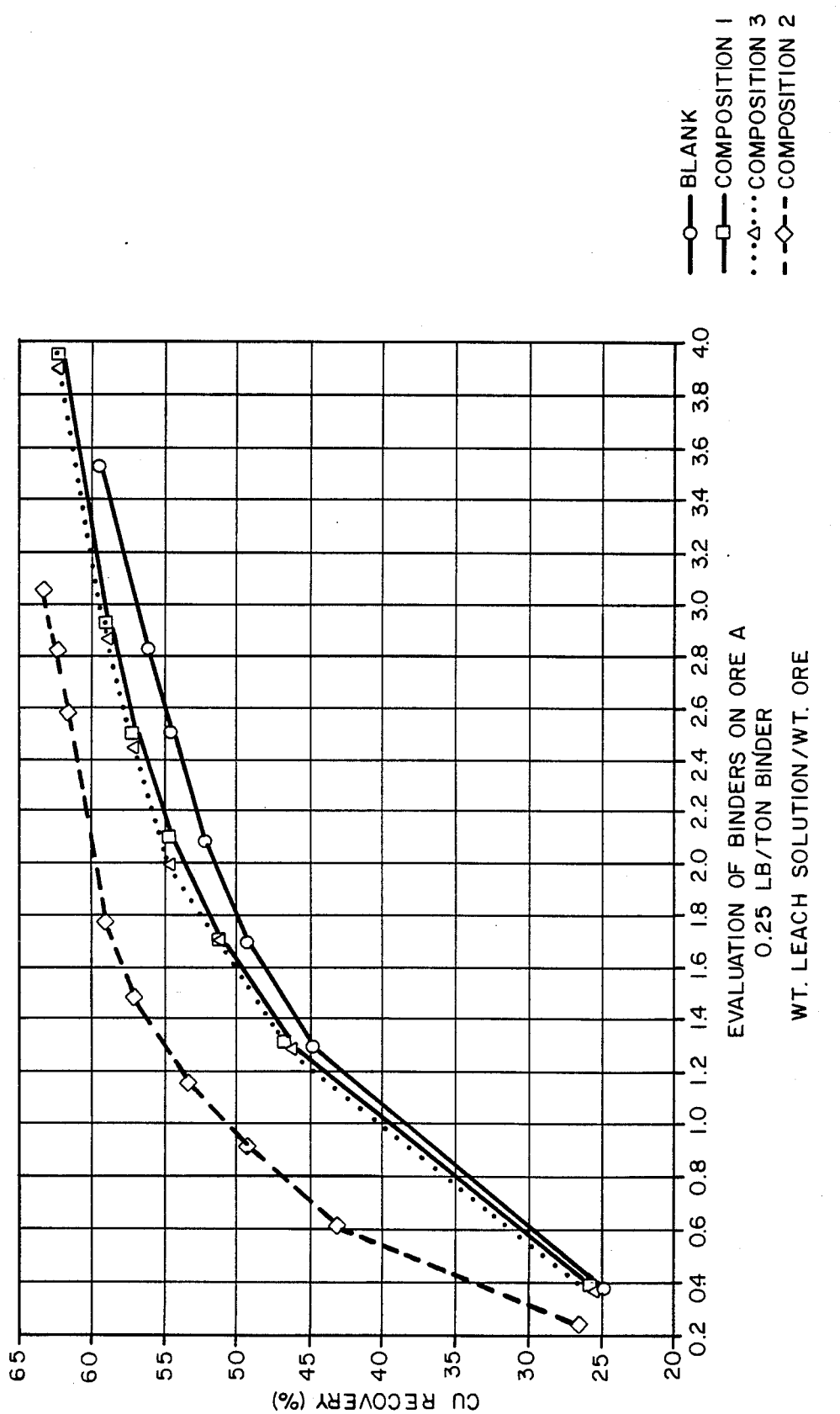
FIG. 1 shows the effect of several binders on a commercial ore.

The invention comprises an improved method for extracting copper from copper minerals by heap leaching with dilute sulfuric acid which comprises agglomerating the copper mineral fines prior to their being formed into a heap with an agglomerating agent comprising an anionic acrylamide polymer which contains at least 5 mole percent of carboxylate or sulfonate groups and has a molecular weight of least 100,000. Equivalent polymers of acrylamide polymers may contain both carboxylate and sulfonate groups.

THE HIGH MOLECULAR WEIGHT WATER-SOLUBLE ANIONIC ACRYLAMIDE POLYMERS

General:

The water-soluble anionic acrylamide polymers are illustrated by polyacrylamide copolymers such as, for instance, acrylic acid, methacrylic acid, itaconic acid, and the like. The amount of anionic component in the acrylamide copolymers will be at least 5 mole percent. Usually it will be between 10-50 mole percent. In some instances the anionic component can be as great as 90 mole percent. The acrylic acid and methacrylic acid polymers are a preferred class.

Another class of anionic acrylamide polymers are the acrylamide copolymers containing sulfonate groups. Illustrative of such polymers are those described in Hoke, U.S. Pat. No. 3,692,673, European patent application No. 0225 596, U.S. Pat. No. 4,703,09 2 and U.S. Pat. No. 4,704,209, the disclosures of which are incorporated herein by reference.

One class of these sulfonated acrylamide terpolymers contain in their structure, in addition to acrylamide:
(A) at least 1 mole % of acrylic acid; and
(B) at least 1 mole % of an alkyl/aryl sulfonate substituted acrylamide.

In a preferred embodiment (A) is present in the copolymer in amounts ranging between 1-95 mole % with a preferred range being 5-70 mole %. (B) is present in the copolymer in amounts ranging between 1-50 and most preferably 5-30 mole %.

The alkyl/aryl group of the alkyl/aryl sulfonate substituted acrylamide contains between 1-10 carbon atoms with a preferred embodiment being an alkyl group of from 1-6 carbon atoms. Most preferably, the sulfonate is substituted on an alkyl group, which can be linear or branched, and contains from 1-6 carbon atoms, preferably 1-4 carbon atoms.

As indicated, the molecular weight of the polymers used in the invention should have a molecular weight of at least 100,000. Preferably, the molecular weight is at least 1 million and most preferably is at least 3 million or more. These molecular weights are weight average molecular weights.

A preferred class of sulfonate-containing acrylamide copolymers are the acrylamide polymers which have been reacted with 2-AMPS[1]. The polymers of this type contain preferably between 5% up to about 50% by weight of the AMPS groups. These copolymers are described in Hoke, U.S. Pat. No. 3,692,673.

[1] 2-AMPS is a trademark of Lubrizol Corporation, and is acrylamide-2-acrylamido,2-methylpropane sulfonic acid copolymer.

It should be pointed out that the anionically charged or modified polymers and copolymers which are utilized in this invention need only to be slightly anionically charged and must be water soluble.

METHOD OF PREPARING THE SULFONATED ACRYLAMIDE-CONTAINING TERPOLYMERS

The terpolymers are prepared by the transamidation reaction of an acrylamide homopolymer or an acrylamide copolymer which contains at least 1 mole % of acrylic acid with an amino alkyl sulfonate. The alkyl group of the amino alkyl sulfonate contains 1-6 and preferably 1-4 carbon atoms. Examples of the preferred starting amino alkyl sulfonates are amino methyl sulfonic acid or amino ethyl sulfonic acid, (taurine). The acrylamide polymer or copolymer is reacted with the amino alkyl sulfonate under following reaction conditions:

I. a reaction temperature of at least 100° C. and preferably at least 110° C.;

II. a reaction time of at least ¼ hour and preferably at least ½ hour;

III. a mole ratio of chemical reactant to polymer ranging between about 2:1 to about 1:50;

IV. a pressure ranging from atmospheric pressure to 35 times atmospheric pressure, or more; thereby achieving the synthesis of the sulfonate polymers described above.

V. in a compatible solvent or solvent admixture for the reactants, preferably, water, or aqueous solvents containing water miscible cosolvents, such as for example, tetrahydrofuran, polyethylene glycols, glycol, and the like.

If the starting polymer is a homopolymer of acrylamide such that no other pendant functional group is present, the condition of the reaction is such that some degree of amide hydrolysis occurs in those reactions in which water or a water containing solvent is utilized. In such cases, a carboxylate functional group is also obtained in addition to the sulfonate modified amide and any unreacted starting amide groups from the starting polymer.

When the alkyl group of the alkyl sulfonate substituted acrylamide present in the terpolymer is a methyl group, a preferred method of preparing such polymers resides in the reaction of the acrylamide polymer or acrylamide acrylic acid copolymer with formaldehyde and a bisulfite. Specifically, these polymers are prepared from acrylamide-containing polymers with sodium formaldehyde bisulfite (or formaldehyde and sodium bisulfite) in from about $\frac{1}{4}$ to about 8 hours at temperatures of at least about 100° C. and at a pH of less than 12, preferably at temperatures higher than 110° C. and at a pH of 3 to 8. Under these reaction conditions, sulfomethylamide readily forms in high conversion, based on the sodium formaldehyde bisulfite charged. Sulfite salts may be substituted for the bisulfite salts in this reaction.

WATER-IN-OIL EMULSIONS OF THE ANIONIC ACRYLAMIDE POLYMERS

It is known that acrylamide and acrylamide acrylic acid polymers as well as other water-soluble vinyl monomers may be polymerized using a so-called inverse emulsion polymerization technique. The finished product of such a polymerization process is a water-in-oil emulsion which contains the water-soluble polymer present in the aqueous phase of the emulsion. When a water-soluble surfactant is added to these emulsions, they dissolve rapidly in water and provide a convenient method for preparing aqueous solutions of these polymers.

The preparation of these emulsions is discussed in Vanderhoff, U.S. Psat. No. 3,284,393. The addition thereto of a water-soluble surfactant to permit rapid dissolution of the polymer into water is described in Re. U.S. pat. No. 28,474, the disclosures of which are incorporated herein by reference.

The transamidation and sulfomethylation reactions described above may be performed on the water-in-oil emulsions of the acrylamide or acrylamide-acrylic acid copolymers to provide the acrylamide terpolymers used in the invention.

Methacrylamide and methacrylic acid may be substituted for acrylamide or methacrylamide acid used in the preparation of the polymers described herein. Similarly, the acrylic acid and the starting sulfonates may be either prepared or used in the form of the free acids or as their water-soluble salts, e.g. sodium, potassium or ammonium and such forms are considered to be equivalents.

The preferred method of preparing any of the polymers of the present invention resides in the utilization of the water-in-oil emulsion polymerization technique described above.

Also, as indicated in Re. U.S. Pat. No. 28,474, when such emulsions are added to water in the presence of a water-soluble surfactant, rapid solubilization of the polymer contained in the emulsion occurs. This represents a convenient and preferred method of preparing solutions of the polymers used as agglomerating aids.

APPLICATION OF THE ANIONIC ACRYLAMIDE POLYMERS TO THE COPPER ORE FINES

The polymers are applied from dilute solutions of sulfuric acid or from water. The concentration of anionic acrylamide polymers in the dilute solution may vary between 0.001 to 5% by weight and preferably 0.03 to 0.2%. The term dilute sulfuric acid solution as used herein and in the claims is meant to include sulfuric acid solutions having a concentration between 5-100 g/l of sulfuric acid. In most instances, the acid concentration will be about 20 g/l.

The amount of anionic acrylamide polymers used to treat and agglomerate the ore fines may vary between 0.01 to 1 lbs./ton. In a preferred embodiment of invention, the dosage is 0.05 to 0.3 lbs./ton.

They are applied during, just before, or after the acidification step.

One method of agglomeration is to spray the solution containing the anionic acrylamide polymers onto the ore in a rotating agglomeration drum or pelletizing disc in a manner to get uniform distribution over the ore. The tumbling ore upon addition of liquid will agglomerate with the fines attaching to the larger particles or the fines will attach to one another and grow to larger porous particles. Sulfuric acid may be sprayed onto the ore either before or after agglomeration.

A second method of agglomeration is to spray the solution containing the anionic acrylamide polymers onto the ore at conveyor belt transfer points to get uniform distribution over the ore. The tumbling action at these and subsequent transfer points will cause the ore to agglomerate. Rakes can also be used on the transfer belts to cause further agitation and agglomeration of the ore. Sulfuric acid may be sprayed onto the ore either before or after agglomeration.

EVALUATION OF THE INVENTION

To illustrate the advantages of the invention, the following are presented by way of examples. The following polymers were tested:

Composition 1:=Latex polyacrylamide having a molecular weight between 5–6,000,000

Composition 2:=Latex polyacrylamide—35 mole % sodium acrylate having a molecular weight between 10–12,000,000

Composition 3:=Latex polyacrylamide—12 mole % sodium acrylamide-2-acrylamido, 2-methylpropane sulfonic acid copolymer having a molecular weight between 5–10,000,000

Composition 4:=Powder polyacrylamide—35 mole % sodium acrylate having a molecular weight between 10–12,000,000

Composition 5:=Latex polyacrylamide—50 mole % sodium acrylate having a molecular weight between 5–10,000,000

Using the above compositions, Table I shows that the agglomerated and bound ore has a higher and constant flow rate compared to the blank in percolation columns. This is true with Composition 1, Composition 2 and Composition 3 polymers.

When the same three polymers were evaluated in pilot leach columns (see Table II and FIG. 1), nonionic Composition I gave a slightly increased recovery as the blank. Composition 3 and Composition 2 gave increased recoveries. The improved activity is due to increasing anionic character or increasing molecular weight.

Figure 2:
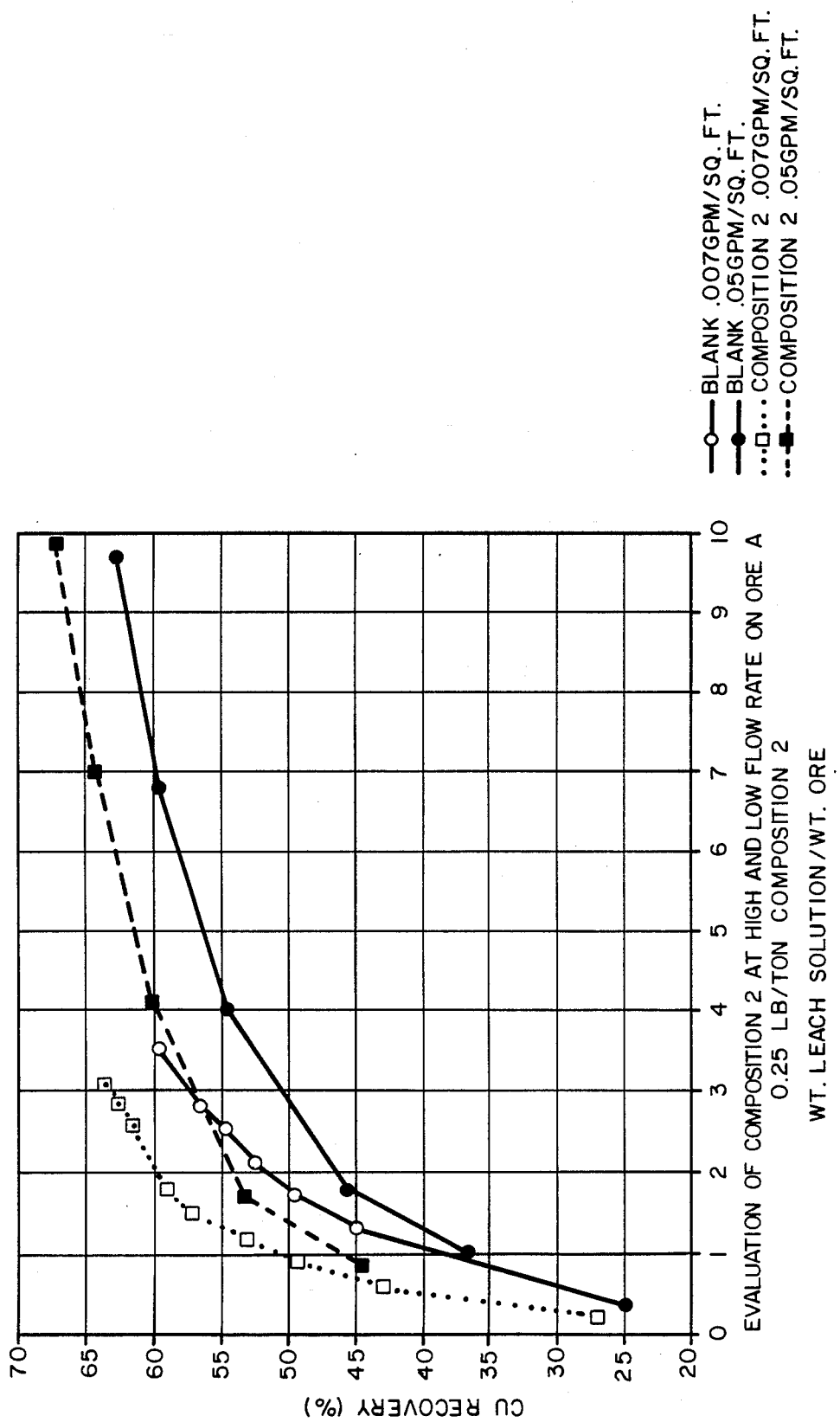
FIG. 2 shows the results of an acrylamide anionic polymer of the invention at high and low flow rates.

FIG. 2 shows that at both high (0.05 GMP/ft$^2$) and low (0.007 GMP/ft$^2$) leach solution flow rate composition 2 gives higher recovery and faster extraction of copper. For both the blank and treated columns, increasing flow rate (lower residence time) gives lower extraction for a given weight of leach solution. However, the high rate with composition 2 gives comparable results with the low rate for the blank.

TABLE I

Percolation Tests on Copper Ore A
Flow Rate of 20 g/l H$_2$SO$_4$ (GPM/ft$^2$)

| Day | Blank | Composition 2 (0.5 lb/ton) | Composition 1 (0.5 lb/ton) | Composition 3 (0.5 lb/ton) |
|---|---|---|---|---|
| 0.12 | 3.0 | 6.5 | — | — |
| 1 | 2.0 | 5.6 | 6.6 | 7.0 |
| 2 | 1.6 | 6.5 | 7.1 | 6.4 |
| 3 | 1.4 | 6.5 | 6.1 | 5.5 |
| 4 | 1.6 | 5.6 | | |
| 7 | 1.1 | 6.5 | | |

TABLE II

PILOT LEACH COLUMNS EVALUATING POLYMERIC BINDERS FOR COPPER ORE-A
40 lb/ton sulfuric acid added after agglomeration
0.007/GPM/ft$^2$ leach rate

| Blank | | Composition 2 (0.25 lb/ton) | | Composition 3 (0.25 lb/ton) | | Composition 1 (0.25 lb/ton) | |
|---|---|---|---|---|---|---|---|
| Wt. Solution ÷ Wt. Ore | Cu Recovery (%) | Wt. Solution ÷ Wt. Ore | Cu Recovery (%) | Wt. Solution ÷ Wt. Ore | Cu Recovery (%) | Wt. Solution ÷ Wt. Ore | Cu Recovery (%) |
| 0.38 | 24.8 | 0.24 | 26.6 | 0.37 | 25.7 | 0.39 | 25.9 |
| 1.3 | 44.7 | 0.61 | 43.0 | 1.29 | 46.5 | 1.31 | 44.2 |
| 1.69 | 49.3 | 0.92 | 49.4 | 1.66 | 51.4 | 1.70 | 48.6 |
| 2.09 | 52.3 | 1.16 | 53.2 | 2.06 | 54.8 | 2.10 | 51.6 |
| 2.51 | 54.6 | 1.49 | 57.2 | 2.46 | 57.3 | 2.51 | 53.9 |
| 2.83 | 56.3 | 1.77 | 59.2 | 2.87 | 59.2 | 2.93 | 55.6 |
| 3.52 | 59.6 | 2.58 | 61.8 | 3.88 | 62.4 | 3.94 | 58.5 |
| | | 2.83 | 62.6 | | | | |
| | | 3.05 | 63.6 | | | | |
| Tail = 0.691% | | Tail = 0.646% | | Tail = 0.653% | | Tail = 0.716% | |
| Calculated head = 1.71% | | Calculated head = 1.78% | | Calculated head = 1.74% | | Calculated head = 1.73% | |

Table IV gives results of an additional run with Composition 2.

Figure 3:
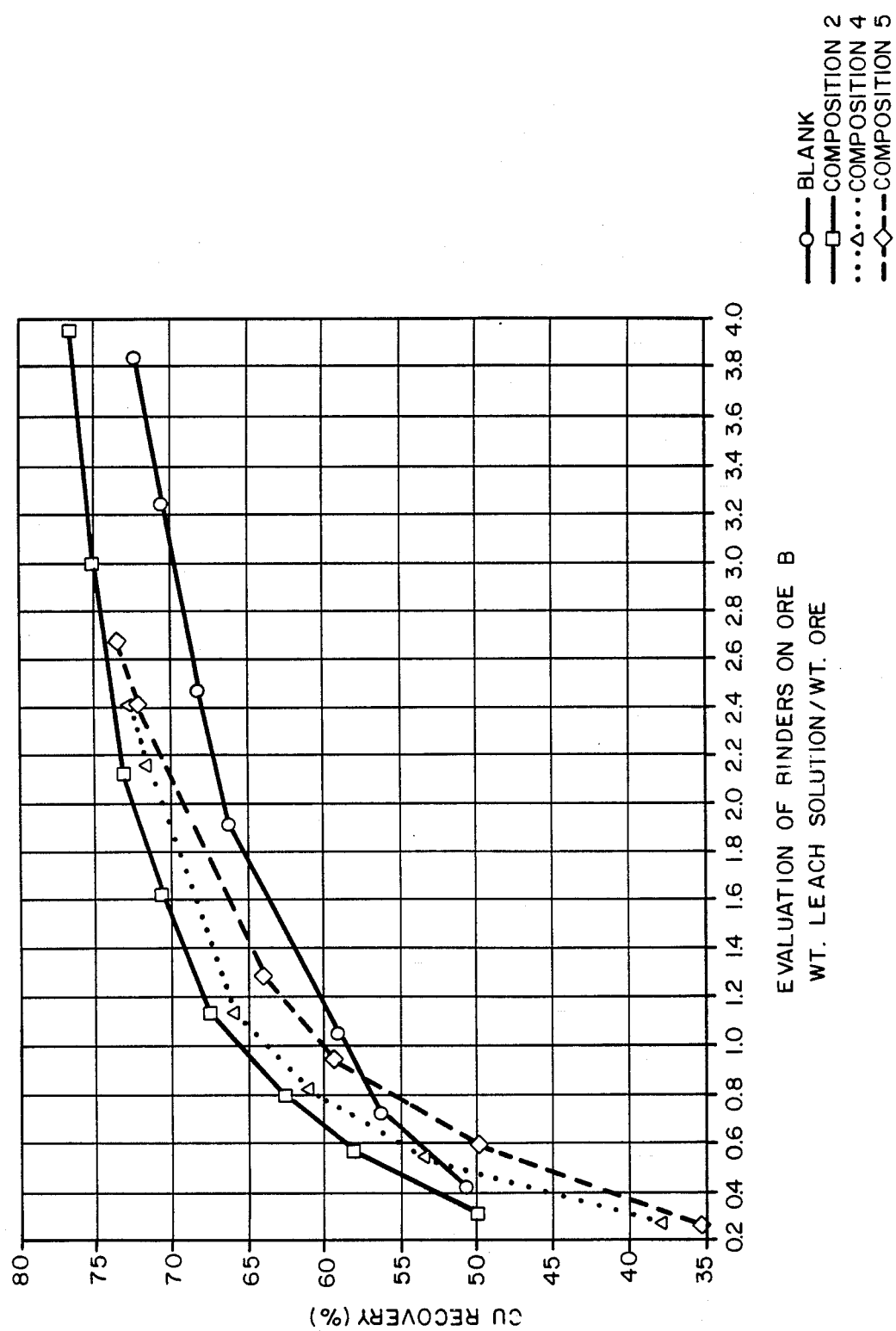
FIG. 3 shows the results of several binders on a second commercial ore.

In pilot leach columns with copper Ore B (see Table V, FIG. 3), composition 2 and composition 4, which are the latex and power form of the same polymer, gave increased recoveries. Compositions 2 and 4 were added from a solution in 20 g/l sulfuric acid and additional sulfuric acid added after agglomeration. Composition 5 also gave increased recoveries when added from a solution in water and sulfuric acid added prior to the polymer.

TABLE III

Evaluation of Composition 2 Binder at High Leach Rate on Ore A
40 lb/ton sulfuric acid added after agglomeration
0.05 GPM/ft$^2$ leach rate

| Blank | | Composition 2 | |
|---|---|---|---|
| Wt. Solution ÷ Wt. Ore | Cu Recovery (%) | Wt. Solution ÷ Wt. Ore | Cu Recovery (%) |
| 9.99 | 36.5 | 0.82 | 44.3 |
| 1.76 | 45.6 | 1.74 | 53.2 |
| 3.99 | 54.6 | 4.09 | 60.2 |
| 6.80 | 59.6 | 7.02 | 64.3 |
| 9.71 | 62.8 | 9.95 | 67.3 |
| Tail = 0.669% | | Tail = 0.646% | |
| Calculated head = 1.80% | | Calculated head = 1.98% | |

TABLE IV

Column Leach Tests on Copper Ore A

| Treatment | Procedure | Flow Rate (GPM/ft$^2$) | Cumulative Daily Recovery (%) | | | | | | | | |
|---|---|---|---|---|---|---|---|---|---|---|---|
| | | | Day 1 | Day 2 | Day 3 | Day 4 | Day 5 | Day 6 | Day 7 | Day 8 | Day 9 |
| 40 #/t H$_2$SO$_4$ | | 0.009 | 6.24 | 21.99 | 28.45 | 33.62 | 38.55 | 41.91 | 44.01 | 45.25 | 48.52 |
| 40 #/t H$_2$SO$_4$ 0.5 #/t Composition 2* | acid and Composition 2 combined | 0.3 | 9.37 | 34.01 | 37.42 | 41.72 | 44.54 | 47.38 | 49.32 | 50.90 | 52.03 |
| 40 #/t H$_2$SO$_4$ 0.5 #/t Composition 2* | acid and Composition 2 added separately | 0.3 | 15.40 | 30.20 | 35.91 | 51.41 | 58.83 | 63.58 | 64.96 | 66.51 | |

*Composition 2 added as a 1% solution in water.

TABLE V

PILOT LEACH COLUMNS EVALUATING POLYMERIC BINDERS ON COPPER ORE B

| 40 lb/ton Concentrated Sulfuric Acid Added After Agglomeration With Polymer | | | | | | | 40 lb/ton Concentrated Sulfuric Acid Added Before Agglomeration With Polymer | |
|---|---|---|---|---|---|---|---|---|
| Blank | | Composition 2* (0.25 lb/ton) | | Composition 4* (0.25 lb/ton) | | | Composition 5+ (0.25 lb/ton) | |
| Wt. Preg. Solution ÷ Wt. Ore | Recovery (%) | Wt. Preg. Solution ÷ Wt. Ore | Recovery (%) | Wt. Preg. Solution ÷ Wt. Ore | Recovery (%) | | Wt. Preg Solution ÷ Wt. Ore | Recovery (%) |
| 0.42 | 50.6 | 0.31 | 49.8 | 0.27 | 37.9 | | 0.26 | 35.3 |
| 0.73 | 56.3 | 0.57 | 57.9 | 0.55 | 53.5 | | 0.60 | 49.9 |
| 1.06 | 59.1 | 0.80 | 62.5 | 0.83 | 61.1 | | 0.95 | 59.4 |
| 1.93 | 66.2 | 1.14 | 67.5 | 1.14 | 66.0 | | 1.30 | 64.1 |
| 2.48 | 68.3 | 1.63 | 70.6 | 2.17 | 71.7 | | 2.43 | 72.5 |
| 3.25 | 70.6 | 2.13 | 73.2 | 2.42 | 72.8 | | 2.68 | 73.7 |
| 3.84 | 72.1 | 3.01 | 75.2 | | | | | |
| | | 3.96 | 76.6 | | | | | |
| Tail Assay | 0.368% | | 0.306% | | 0.367% | | | 0.354% |
| Calculated Head | 1.31% | | 1.31% | | 1.35% | | | 1.35% |

*Composition 2 and Composition 4 added from solution of 20 g/l $H_2SO_4$
+Composition 5 added from solution in water.

We claim:

1. An improved method for extracting copper from copper minerals by heap leaching with dilute sulfuric acid which comprises agglomerating the copper minerals prior to their being formed into a heap with an agglomerating agent comprising an anionic acrylamide polymer which contains at least five mole percent of carboxylate or sulfonate groups and has a molecular weight of at least 100,000, and then leaching copper from said copper minerals by heap leaching with dilute sulfuric acid, collecting the copper-rich leachate, and recovering copper therefrom.

2. An improved method of claim 1 wherein the anionic acrylamide polymer has a molecular weight of at least 3,000,000.

3. An improved method of claim 1 wherein the anionic acrylamide polymer is an acrylic acid or methacrylic acid polymer.

4. The improved method of claim 1 wherein the anionic acrylamide polymer contains sulfonate groups.

5. The improved method of claim 4 where the anionic acrylamide polymer is acrylamide-2-acrylamido,2-methylpropane sulfonic acid copolymer.

* * * * *